W. W. St John,
Stump Elevator.

No 57,593.        Patented Aug 28, 1866.

Witnesses:
J. M. Randolph
Henry W Kaatz

Inventor:
Wm W St John

UNITED STATES PATENT OFFICE.

W. W. ST. JOHN, OF ST. LOUIS, MISSOURI.

IMPROVEMENT IN GRUBBING-MACHINES.

Specification forming part of Letters Patent No. 57,593, dated August 28, 1866.

*To all whom it may concern:*

Be it known that I, W. W. ST. JOHN, of the city and county of St. Louis, and State of Missouri, have invented a new and useful Grubbing-Machine; and I do hereby declare that the following is a full, clear, and exact description thereof, reference being had to the accompanying drawings, and to the letters of reference marked thereon.

Figure 1:
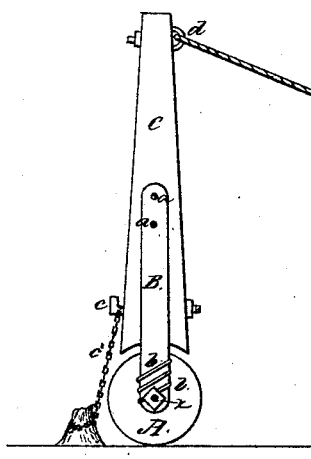
Figure 2:
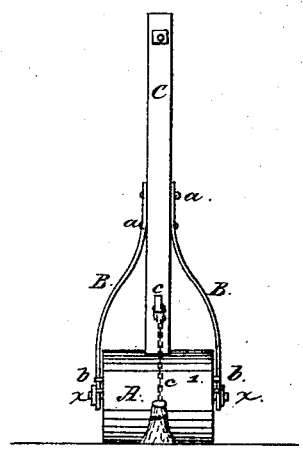
Figure 3:
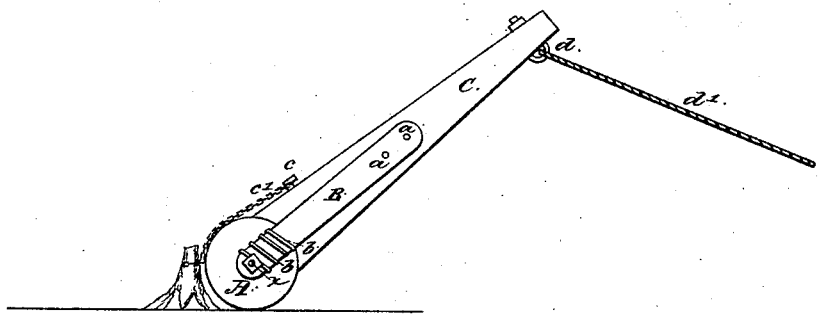

Figure 1 of the accompanying drawings is a side elevation of one of the improved machines, showing the pole in a vertical position, as it would be when first attached to the grub or stump. Fig. 2 is a rear-end elevation of the machine in the same position it is represented in in Fig. 1. Fig. 3 is a side elevation of the machine when the pole is partly drawn down and the grub or stump is raised somewhat up out of the ground.

To enable those skilled in the art to make and use my machine, I will proceed to describe its construction and operation.

A is a roller, which may be made either solid, of one piece, or it may be built up of different pieces, either of wood or iron; but the most simple and economical form would be to make it in one solid piece.

Passing through the longitudinal axis of said roller, or attached to both ends of it in the prolongation of the said axis, are journals $x$, which find their bearings in the back ends of the two braces or hounds B B. The forward ends of these hounds are securely fastened to the poll C by means of the bolts $a\ a$.

The rear end of the pole C is cut out concavely, so it would fit tightly up to the periphery of the roller were it to rest against the same.

There are spiral or other similar springs $b\ b$ fastened to the rear ends of the braces or hounds B B in such a manner as to rest against the journals $x\ x$ and throw the said hounds and pole forward off of the roller, as shown in Fig. 1.

A hook, $c$, is securely fastened to the pole at some convenient point, so that the chain $c'$ may be hooked on to it at pleasure.

A ring, $d$, is fastened to the pole near its forward end, and the draft-rope $d'$ is fastened to this ring.

The machine thus constructed may be taken to the place where it is to be used and backed up to the stump or grub that is to be operated upon, and the pole raised up in a vertical position, as shown in Fig. 1. The chain $c'$ is then to be hooked around the said stump or grub, and also attached to the hook $c$. The team or other power to be used is then to be applied to the draft-rope $d'$, when the pole will be drawn down toward the position shown in Fig. 3, and a powerful leverage will thus be exerted upon the stump or grub to pull it up out of the ground, and the chain will in this position rest on the upper and rear periphery of the roller, which now becomes a fulcrum.

As soon as the power is applied to the upper end of the lever to draw it down, the concave end of it comes down upon the roller, the springs $b\ b$ yielding in the operation, and all strain upon the braces or hounds is therefore removed during the operation of drawing a stump.

When the machine is being drawn to or from the place where it is to be used the springs $b\ b$ will throw the pole forward off of the roller, which is then free to revolve around its axis.

By the above-described arrangements of the parts all ratchets and pawls, such as are used in other grubbing-machines, are obviated, which is a fact of great importance, as those parts are easily broken.

In this machine the friction between the pole and roller is sufficient to cause the roller to revolve away from the stump as soon as the power is applied to the rope $d'$.

Having described my invention, what I claim is—

The combination and arrangement of the roller A with the hounds or braces B B, the springs $b\ b$, and the pole C, substantially as and for the purpose set forth.

WM. W. ST. JOHN.

Witnesses:
M. RANDOLPH,
HENRY W. KRAATZ.